United States Patent [19]

Bultman et al.

[11] Patent Number: 4,708,238
[45] Date of Patent: Nov. 24, 1987

[54] CLEATED CHANNEL BELT CONVEYOR

[75] Inventors: Marten Bultman, Crestwood; Edwin L. Wilding, Louisville, both of Ky.

[73] Assignee: Griffin & Company, Inc., Louisville, Ky.

[21] Appl. No.: 724,081

[22] Filed: Apr. 17, 1985

Related U.S. Application Data

[62] Division of Ser. No. 502,183, Jun. 8, 1983, abandoned.

[51] Int. Cl.$^4$ ............................................. B65G 23/04
[52] U.S. Cl. .................................... 198/835; 198/319; 198/861.5; 248/666
[58] Field of Search ............... 198/319, 835, 864, 865, 198/318, 720, 861.5, 826, 834; 248/666

[56] References Cited

U.S. PATENT DOCUMENTS

| | | |
|---|---|---|
| 1,438,914 | 12/1922 | Habbart .............................. 198/865 |
| 1,863,562 | 6/1932 | Cannon . |
| 1,995,589 | 3/1935 | Sinden . |
| 2,444,521 | 7/1948 | Mulkey et al. .................. 198/865 X |
| 2,515,988 | 7/1950 | Conrad . |
| 2,528,917 | 11/1950 | Slocum . |
| 2,572,290 | 10/1951 | Vutz . |
| 2,747,722 | 5/1956 | Slavens . |
| 2,751,063 | 6/1956 | Wilcoxen et al. . |
| 2,759,591 | 8/1956 | Erickson . |
| 2,925,740 | 2/1960 | Chung ................................ 248/666 |
| 2,998,121 | 8/1961 | Gilbert . |
| 3,178,011 | 4/1965 | Oshanyk . |
| 3,360,107 | 12/1967 | Lockwood . |
| 3,738,031 | 6/1973 | Lott . |
| 3,743,078 | 7/1973 | Pittoreau ........................ 198/861.5 |
| 3,750,861 | 8/1973 | Holtsclaw et al. . |
| 3,828,918 | 8/1974 | Holtsclaw et al. . |
| 3,942,626 | 3/1976 | Wilding . |
| 4,230,222 | 10/1980 | Clark . |
| 4,321,996 | 3/1982 | Snacken et al. . |

FOREIGN PATENT DOCUMENTS

| | | |
|---|---|---|
| 131737 | 7/1978 | Fed. Rep. of Germany ...... 198/865 |
| 2418755 | 11/1979 | France . |

Primary Examiner—Joseph E. Valenza
Attorney, Agent, or Firm—Wood, Herron & Evans

[57] ABSTRACT

A variable slope, cleated channel belt conveyor includes a bed, a bottom pan, and an improved elongated cleated belt. The belt extends around a drive and an idler or take-up pulley and includes a plurality of separate cleats to sweep particulate material along the bottom pan and upwardly onto the belt's top surface by means of a hood extending around the pulley of that end of the conveyor. This prevents build-up of particulate material in the bottom pan. The hood can be pivoted away from the belt to permit reverse operation of the conveyor, and hoods can be mounted at both ends to further accommodate a reversing operation. A universal, adjustable mounting permits the motor and gear box to pivot and thus remain level despite conveyor inclination.

7 Claims, 11 Drawing Figures

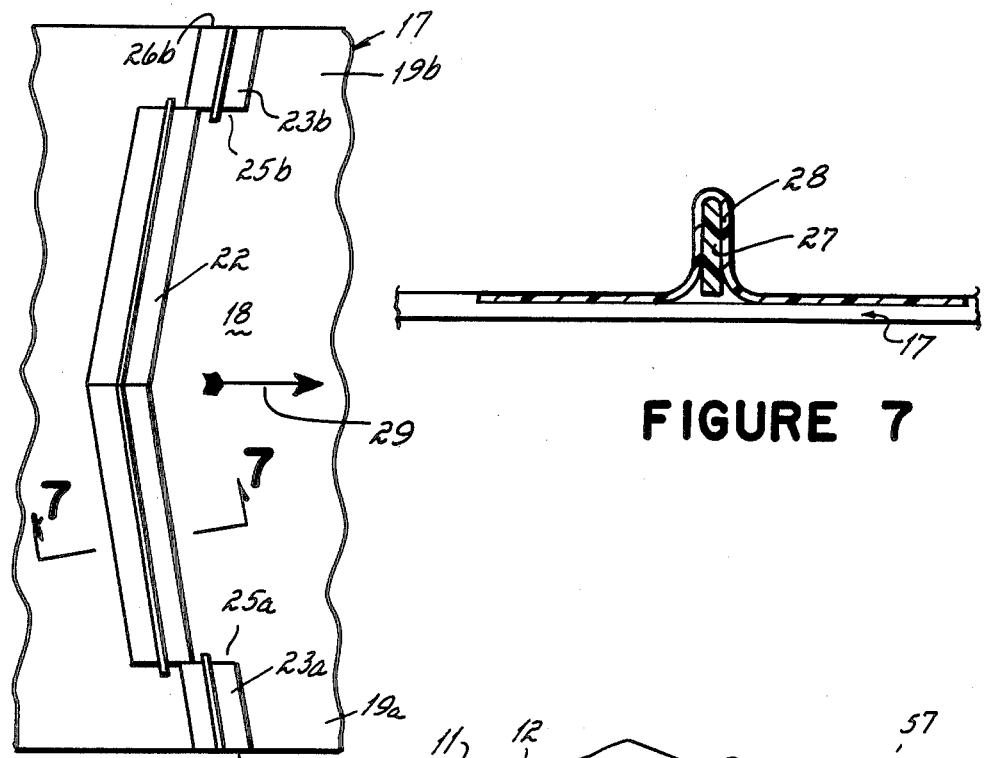
FIGURE 6
FIGURE 7
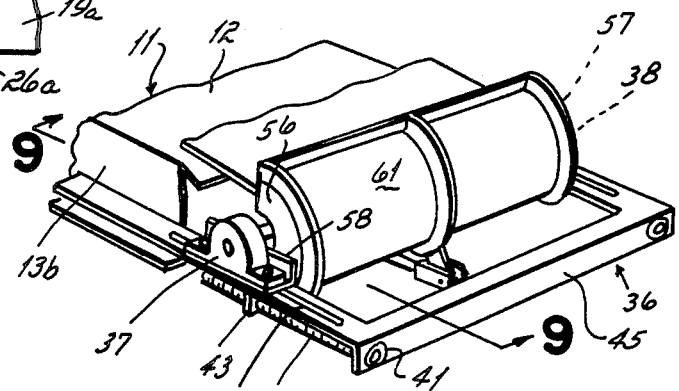
FIGURE 8
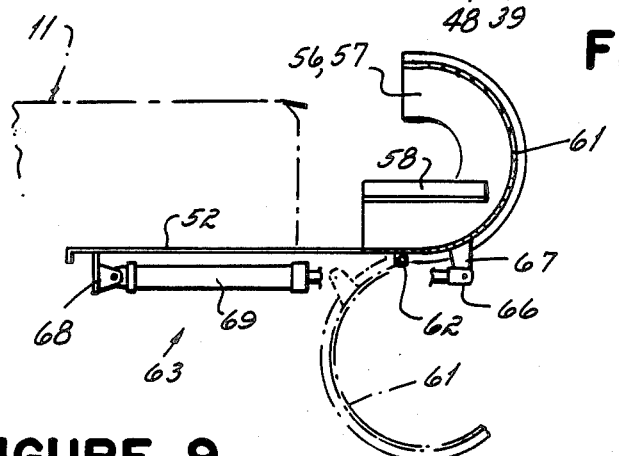
FIGURE 9

CLEATED CHANNEL BELT CONVEYOR

This is a division of application Ser. No. 502,183, filed June 8, 1983, abandoned.

The present invention relates to belt conveyors and more particularly to cleated channel belt conveyors.

A typical belt conveyor includes a flexible, elongated endless belt entrained around two pulleys mounted on horizontal axes at opposite ends of a frame. The top run of the belt typically runs along and is supported by a top bed and the bottom run extends below this top bed above a bottom pan. To provide a channel belt conveyor, the top bed typically includes rollers directing the sides of the belt into a channel configuration, and side walls or flanges for maintaining the channel configuration between the rollers on each side of the belt.

A channel belt conveyor is particularly useful for conveying particulate materials such as tobacco products, i.e., cut filler, strip and the like.

Even though this channel configuration minimizes material falling off to the side of the conveyor belt, material can still find its way onto the bottom pan of the conveyor belt. The particulate material can build up in the bottom pan and produce frictional drag on the conveyor belt.

A method to avoid this problem is to utilize cleats or sweepers on the belt itself. These cleats are relatively rigid members which extend across the width of the belt and which are high enough to sweep the bottom pan free of any material as they move along the bottom run.

In a channel belt conveyor, however, a typical cleated belt is unsatisfactory. Since the belt itself is bent at the sides to form a channel in the conveying run, a rigid cleat extending completely across the belt cannot be used since it will not bend to provide for the channel configuration into which the belt is flexed. Accordingly, it has been one objective of this invention to provide an improved cleated conveying belt for use in a channel belt conveyor.

Further, it is undesirable to simply sweep particulate material on the bottom pan from the end of the conveyor belt pan onto the floor. This creates excessive dust.

In the past, it has been known to use a hood extending from the bottom pan of a belt conveyor to the top belt run to enable the cleats to direct the particulate material back to the conveying surface of the belt. Such hoods involve several inherent difficulties.

If an adjustment of the take-up pulley is made at this hooded end, for example, the distance between the belt and the hood does not remain constant and the hood can be so far from the pulley that the cleats will fail to sweep the surface of the hood, allowing the particulate material to fall back onto the bottom pan. Alternately, the belt can be adjusted so close to the hood that the cleats cannot pass the hooded end.

Accordingly, it has been a further objective of this invention to provide an improved hood for a cleated belt conveyor, the operation of which is unaffected by belt take-up adjustment.

An additional problem with a hooded cleated conveyor belt is encountered if the belt motion is reversed. Typically, the belt runs in a direction where the cleat first sweeps the bottom and then slides from the bottom up onto the hood and sweeps material up along the hood onto the top of the belt. The discharge end of the belt is normally at the other end of the conveyor. It is desirable at times to reverse the direction of the belt and discharge at the hooded end. This is impractical with known hooded conveyors since the hood prevents the discharge of material from the hooded end.

Accordingly, it has been a further objective of the invention to provide a reversible cleated belt conveyor with a sweep hood for facilitating bottom pan cleaning in at least one direction of conveyor operation.

Finally, it is known to incline belt conveyors for conveying purposes, but this presents a problem with the conveyor drive. It is highly desirable to maintain such drives in a horizontal position so crankcase and gear box oil levels are not disturbed. If the gear box is out of level, for example, oil can drain from the gear box or into undesirable areas therein, or away from seals, permitting them to dry out. Any such incline normally tilts the associated drive and motor, upsetting the preferred level oil position with respect to the gear box.

Moreover, the height of a drive and its relationship to the elevational dimensions of the conveyor are always of concern. A drive extending significantly above or below the conveyor limits mounting and use of conveyors with respect to ceilings and floors, for example.

Accordingly, it has been a further objective of the invention to provide, in a variable slope conveyor, an improved drive mount capable of maintaining a level drive independently of conveyor inclination. A further objective has been to provide such an improved mount and drive substantially confined within the elevational dimensions of the conveyor so as to facilitate conveyor use near floors or ceilings.

In light of the foregoing problems, it is a further object of this present invention to provide an improved cleated channel belt conveyor.

In accordance with certain aspects of the present invention, a preferred embodiment includes a cleated channel belt conveyor having a belt with a plurality of three-piece cleats. Each three-piece cleat includes a V-shaped cleat positioned in the center of the belt. The vertices of alternating three-piece cleats are pointed toward each other. Two side cleats are mounted on either side of each V-shaped cleat and just forwardly thereof, i.e., on the opposite side of the vertex. These cleats are slanted to direct the material carried by the belt toward the V-shaped cleat and into the center of the belt. Each of these cleats are separated from each other which allows the belt to flex or be bent between the side cleats and the V-shaped cleat to form a channel configuration.

In another aspect of the preferred embodiment of the present invention, the conveyor includes a hood extended around the belt idler or take-up pulley. The idler pulley is supported on a shaft running through the conveyor frame and rotatably supported by two adjustably mounted pillow block bearings. The hood is mounted to the bearings, thereby insuring that the hood moves with the pulley so the distance from the hood to the idler pulley is always the same, even though the pulley is moved to adjust the tautness of the belt.

In an alternate embodiment, the hood is formed from a bottom member and a pivoted, partially cylindrical web member which extends from the bottom member up and around the idler pulley. The cylindrical portion is pivoted away from the pulley, in response to reversal of the conveyor belt direction, to permit material to be discharged from the hooded end of the conveyor.

In another aspect of this embodiment, a second pivoted hood can be mounted at a drive end of the conveyor and pivoted into place in response to belt reversal in order to continue the bottom pan to belt conveying surface sweeping operation. In this embodiment, the belt with alternating cleat vertices is useful.

In still another aspect of a preferred embodiment of the present invention, the motor and gear box are supported by a universal mount for maintaining a level drive, despite conveyor inclination. Preferably, the conveyor drive pulley has a drive shaft to which the output shaft of a motor or gear box is coaxially connected. A universal mounting plate is secured to the conveyor and is provided with two arcuate slots. The slots both have a focus at the axis of the drive pulley. One of a variety of adaptor or support brackets is adjustably fixed to the plate by fasteners extending through the brackets and mounting plate slots. Motors or gear boxes of various types are connected to the respective adaptor, and thus to the conveyor for tilting motion with respect thereto. The slots permit the brackets and the attached drive motor and gear box to be rotated about the drive axis in order to maintain the gear box at a level position, independently of conveyor inclination.

The objects and advantages of the present invention will become readily apparent from the following detailed description of the preferred embodiment thereof, and from the drawings in which:

FIG. 6 is an overhead view of the belt broken away showing the cleated portion of the belt;

FIG. 7 is a cross-sectional view of the belt taken at line 7—7 of FIG. 6;

FIG. 8 depicts a preferred embodiment of the present invention showing the hooded end of the conveyor belt;

FIG. 9 is a side view of FIG. 8 taken at lines 9—9 with the hood in broken lines pivoted away from the belt.

DESCRIPTION OF THE PREFERRED EMBODIMENT

Figure 1:
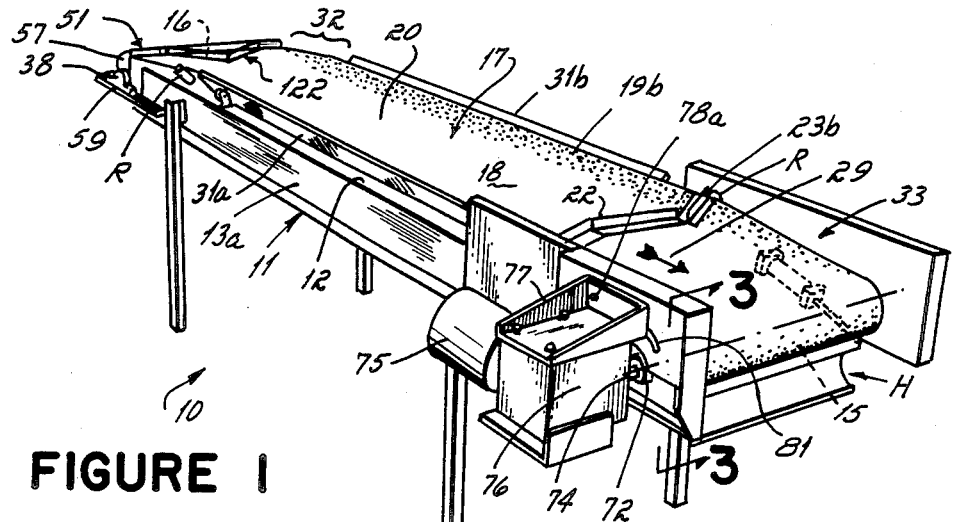
FIG. 1 is a perspective view of the cleated channel belt conveyor of the present invention.

Referring now particularly to the drawings, there is illustrated a channel conveyor 10 according to the invention. The conveyor includes an elongated frame 11 which includes an elongated belt supporting slide bed 12 having integral sides 13a and 13b turned downwardly from the bed to form the lateral side of the conveyor frame. The frame further includes an elongated bottom pan 14 extending from side 13a to side 13b. A drive pulley 15 and a take-up idler pulley 16 are mounted on horizontal axes at each end of the elongated conveyor 10. Both pulleys may be either cylindrical in shape or substantially cylindrical, but slightly crowned for belt tracking purposes.

An elongated endless belt 17 is mounted around pulleys 15 and 16 such that a central portion 18 of the belt is supported directly on the bed 12. The belt has two elongated edge portions 19a and 19b which extend along the opposite edges of the belt. When mounted on the conveyor, the belt provides an upper load bearing run 20 and a lower return run 21 which lies a predetermined distance above the bottom pan 14.

The belt can be manufactured from any suitable form of flexible material such as any well known cotton, canvas-like material or from a combination of materials and can be impregnated, rubberized and of multiple-ply construction. Preferably, the belt is manufactured from a plurality of plies, such as seven plies, and is provided along its edges with two sets of three parallel cuts which run between the central portion of the belt 18 and the edge portions 19a and 19b. The cuts (not shown) are preferably about three plies deep and allow the edge portions 19a and 19b to be angled upwardly from the plane of the central portion of the belt 18 as will be described. Also, the cuts are discontinuous of the cleats for about 6 inches forwardly and rearwardly of the cleat.

Figure 2:
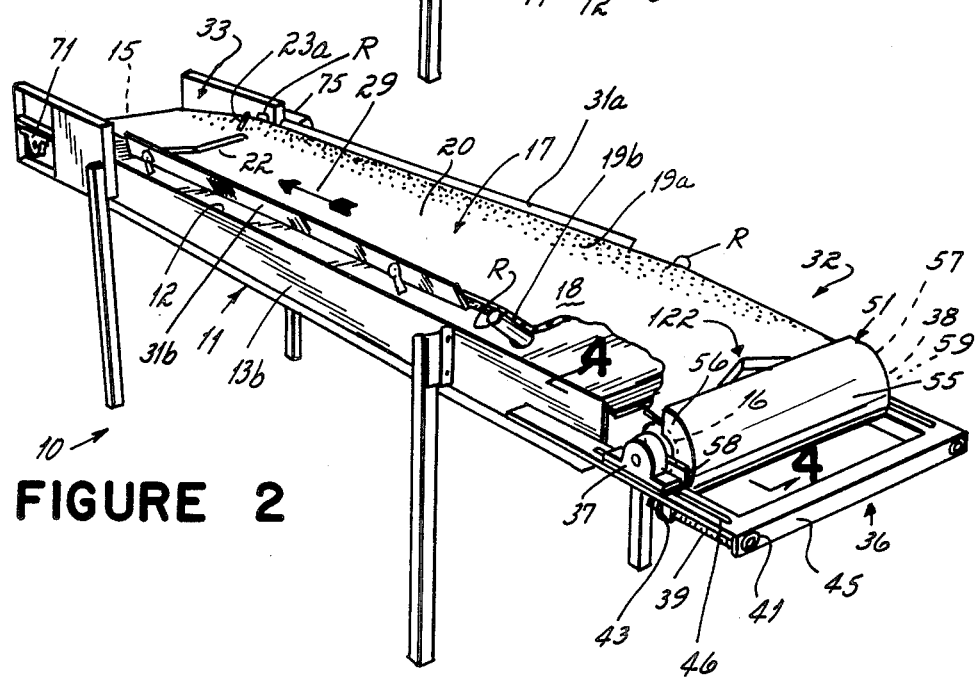
FIG. 2 is a reverse angle perspective view of the channel belt conveyor shown in FIG. 1 wherein the belt is partially broken away.
Figure 2A:
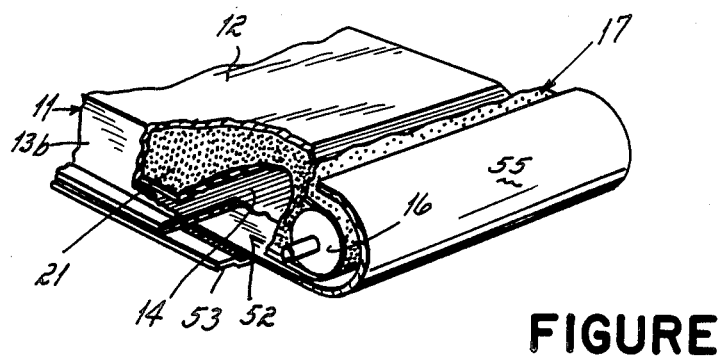
FIG. 2a is a perspective view of a portion of the conveyor belt shown in FIG. 2 wherein the side of the conveyor frame and portions of the belt are broken away.

To provide a channel configuration, a pair of rollers R are mounted on the upper bed 12 at each side of the belt (FIG. 2). Belt-supporting flanges 31a, 31b are mounted along the bed 12 and provide a belt supporting surface for maintaining the edge portions 19a and 19b of the belt above the bed as initially directed by the rollers. As shown in FIG. 1, the belt is normally entrained about pulleys 15 and 16 and the belt assumes a relatively flat configuration across its entire width. As the belt enters its load bearing run 20, the edge portions of the belt are raised by the rollers R and the belt is reoriented at a break-over area 32 into a channel-like configuration. Assuming the motion of the belt is in the direction of arrow 29 of FIG. 1, the belt continues this channel-like configuration until it passes flanges 31 and break-over area 33. Thereafter, it passes downstream rollers R and returns to its flat form, conforming to the surface of the drive pulley 15, and is drawn through its return run beneath the bed towards pulley 16. The flanges and rollers are preferably adjustable and are more particularly disclosed in U.S. Pat. No. 3,942,626 which is incorporated herein by reference.

As shown in FIG. 6, the belt further includes a plurality of three-piece sweeping cleats, each including a central cleat 22, and two side cleats 23a and 23b. The central cleat 22 is a V-shaped cleat that runs across the central portion 18 of the belt with the vertex pointed away from the direction the belt normally runs.

An alternating set of three-piece cleats 122, as partially shown in FIG. 1, is constructed just like the prior mentioned cleats, except with vertices pointed in an opposite direction. One three-piece cleat of this set is disposed between two of the three-piece cleats as mentioned above so adjacent three-piece cleats have vertices pointint toward each other. This facilitates reverse conveyor operation as will be appreciated.

The normal forward direction of motion of the conveyor belt is shown by arrow 29 in FIG. 1 and FIG. 6. The two side cleats 23a and 23b of each three-piece cleat lie upon the edge portions 19a and 19b, respectively of the belt and lie slightly forward of the central cleat portion 22. The two side cleats 23a and 23b are positioned so that their inner edges 25a and 25b are positioned slightly rearwardly of their outer edges 26a and 26b relative to the direction of movement of the belt when it runs away from the direction in which the vertex of the cleat points. As the belt moves, this cleat configuration directs material away from the sides of the belt and into the central portion of the belt. Further, because the three cleats are separate from each other, the belt can be bent between the side cleats and the central V-shaped cleat. This permits the belt to be shaped into a channel configuration.

The cleats can be made from a variety of different materials. As shown in FIG. 7, the cleats generally include an elongated central relatively rigid rib member 27 which is held to the belt by an over-ply of the belt material 28 vulcanized to the belt. Over-ply 28 is inletted into the belt as shown in FIG. 7. Discontinuity of the three parallel belts sets, mentioned above, produces a flexible belt for channel configuration without weakening the belt at the cleat area. Central rib 27 is preferably formed from a hard but resilient material such as hard rubber. The height of the cleat should be at least about equal to the distance from the bottom run of the belt to the bottom pan to permit the cleats to sweep the bottom pan clean and remove any material on the bottom pan.

As previously stated, the belt 11 wraps around drive pulley 15 and idler pulley 16. Drive pulley 15 is stationary with respect to the conveyor frame. Therefore, the belt slack is adjusted by altering the position of idler pulley 16 with respect to the conveyor frame and the drive pulley. The take-up pulley 16 is mounted on a shaft rotatably supported by two pillow block bearings 37 and 38 mounted on C-shaped support frame 36. Pulley 16 is moved relative to the support frame 36 by adjusting the position of bearings 37 and 38 on support frame 36. The means of adjusting both bearings is the same and only the adjustment of pillow box 37 is described.

The position of bearing 37 is adjusted by turning threaded adjusting rod 39. The adjusting rod 39 is an externally threaded rod which engages the pillow box at an internally threaded aperture in tab 43. Tab 43 extends from the pillow box 37 through slot 48 in frame 36. The head 41 of adjusting rod 39 is rotationally secured to the back or bight portion 45 of the C-shaped support frame 36. Thus, by turning the adjusting rods, the bearings and the pulley are moved together, and relative to the frame, thus tightening or loosening the belt.

At the idler pulley end of the conveyor belt 10 is a take-up hood 51. The purpose of the hood is to enable the cleats 22, 23a and 23b to sweep the bottom pan clear of any loose material which might have fallen onto the bottom pan and direct it back onto the top of the conveyor belt.

Figure 5:
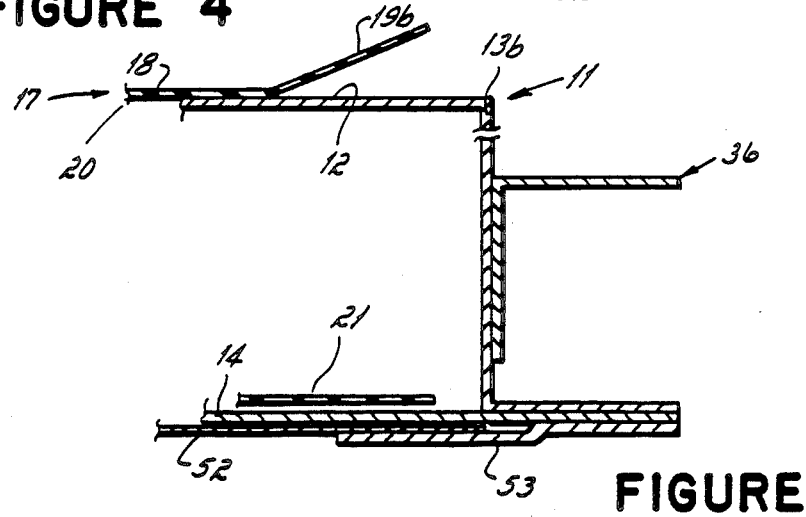
FIG. 5 is a cross-sectional view taken at line 5—5 of FIG. 4.
Figure 10:
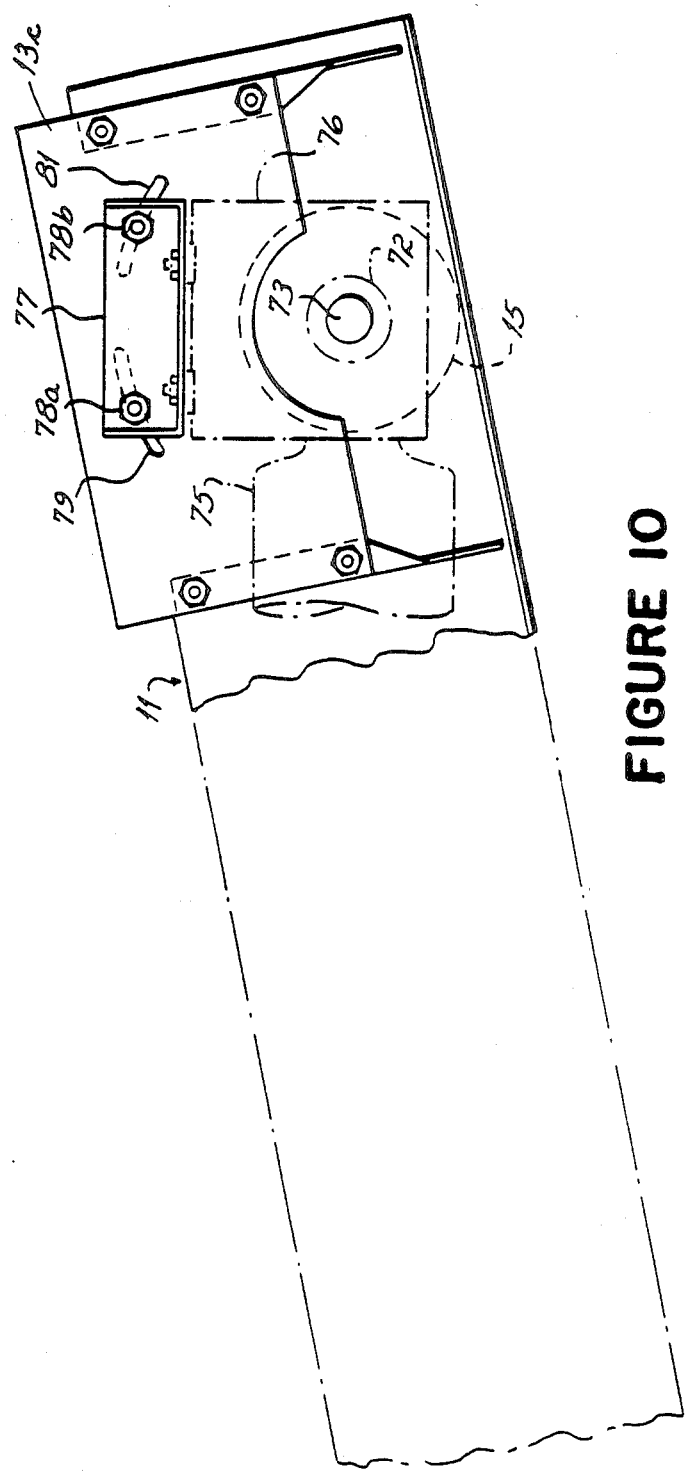
FIG. 10 is a side elevational view similar to FIG. 3, but illustrating the elongated conveyor in an inclined position with the drive means remaining level.

The hood 51 includes a bottom web member 52 which is also referred to as a take-up wrap which is slidably held against the bottom pan of the conveyor belt by two S-shaped side brackets. The two S-shaped brackets are mirror images of each other, and only bracket 53 is shown (see FIG. 5). The side brackets each provide a channel between the bottom pan 14 and the bracket 53 to receive an edge of the bottom web member. This allows the web member to slide relative to the bottom pan and still provide a continuous surface from the bottom pan to the hood. The hood also includes a generally cylindrically shaped web member 55 extending from the bottom web member 52 up around the idler pulley to above the upper run of the conveyor belt. The take-up hood 51 preferably includes two side members 56 and 57 which are welded to at least the bottom web member 52 and if desired, the cylindrical or arcuate web member 55.

The hood is connected directly to the pillow block bearings 37 and 38 by L-shaped brackets 58 and 59. These brackets are connected to the side members 56 and 57 of the take-up hood 52 and to the bottoms of the pillow boxes 37 and 38. Accordingly, whenever the idler pulley is adjusted by moving the bearings, the hood is likewise moved maintaining a constant distance between the idler pulley and the arcuate web member 55 of the take-up hood 51.

When the belt is reversed in direction so that the direction is opposite the direction indicated by arrow 29, the hood 51 would normally interfere with the discharge. While the fixed hood described above is useful for single direction conveyors, according to a preferred embodiment of the present invention, the hood is pivotally mounted and means to move the arcuate web member of the hood 51 out of position are provided in order to permit material discharge from this end of the conveyor. This embodiment is shown more particularly in FIGS. 8 and 9. In this embodiment, the arcuate web member, designated in FIG. 8 as 61, is not welded to the side members 56 and 57 as previously described. Rather, it is attached to the bottom web member at a hinge 62 which allows the arcuate web member to pivot away from the idler pulley.

As shown in FIGS. 8 and 9, one end of a hydraulic or pneumatic cylinder with extensible piston 63 is secured to the arcuate web member 61. The opposite end of the piston is secured to the bottom web member 52. The piston acts to automatically move the arcuate web member 61 out of position and away from the idler pulley. More specifically, yoke 66 of piston 63 is hingedly connected at bracket 67 to the arcuate web member 61. The cylinder 69 of the piston is hingedly attached to the take-up wrap at bracket 68. When the piston is in an extended position as shown in solid lines of FIG. 9, the arcuate member 61 is held in an engaged position near the idler pulley. When the piston is in a retracted position as shown in broken lines in FIG. 9, the arcuate portion 61 is held away from the idler pulley in a disengaged position.

The piston can be activated by any suitable known means. Preferably, the cylinder will be activated automatically so that upon turning a switch to reverse direction of motion of the drive pulley, the cylinder will retract the piston and pull the arcuate web member away from the idler pulley as shown in ghost lines in FIG. 9. Again, upon reversing the drive of the motor, the piston would be extended outwardly, pushing the arcuate member 61 forwardly and upwardly toward the idler pulley.

It is important to note in this embodiment that the pivoted hood still remains in a predetermined relationship to the take-up pulley which does not vary with belt slack adjustment of the pulley.

When the conveyor direction is reversed and the hood pivoted away from the conveyor as described above, it will be appreciated that the bottom pan cleaning feature is disturbed. The alternate cleats function to convey particles on the bottom pan in an opposite direction toward the drive end. Nevertheless, the particles appear to be projected off the bottom pan and not onto an upper run of the conveyor.

To solve this difficulty, the invention contemplates use of a second pivoted hood H (FIG. 1). This hood is pivoted to the conveyor side frames, as diagrammatically shown, and is hydraulically or pneumatically actuated to pivot into position, adjacent the belt wrap of the drive pulley, when the conveyor direction is reversed. Accordingly, the hoods at respective ends of the conveyor, operate in response to conveyor reversal, one pivoting into position, and one out of position, together with the alternating cleat belt, accommodate reversal and at the same time retain the particulate sweeping feature from the bottom pan irrespective of conveyor direction.

It will be appreciated that this hood, together with the hood at the take-up end, can be pivoted to either lower, as shown, or to rise up and away from the conveyor, depending on the clearances required for a particular installation.

The invention further contemplates a universal drive mount for maintaining a level drive independent of conveyor slope or inclination.

The drive pulley 15 is mounted on a shaft rotationally supported by bearings on each side of the frame, such as by a pillow block bearing 71 shown mounted on the side 13b of the frame. The bearing for the opposite shaft end at the drive side is not shown for reasons of clarity of the figures. At the opposite side of the conveyor, the drive shaft 73 of pulley 15 is attached directly to the output shaft 74 of a motor-driven gear box 76 by a direct coupling shown diagrammatically at 72, and outwardly of the pulley shaft bearing. Gear box 76 is operably connected to a suitable motor 75.

Figure 3:
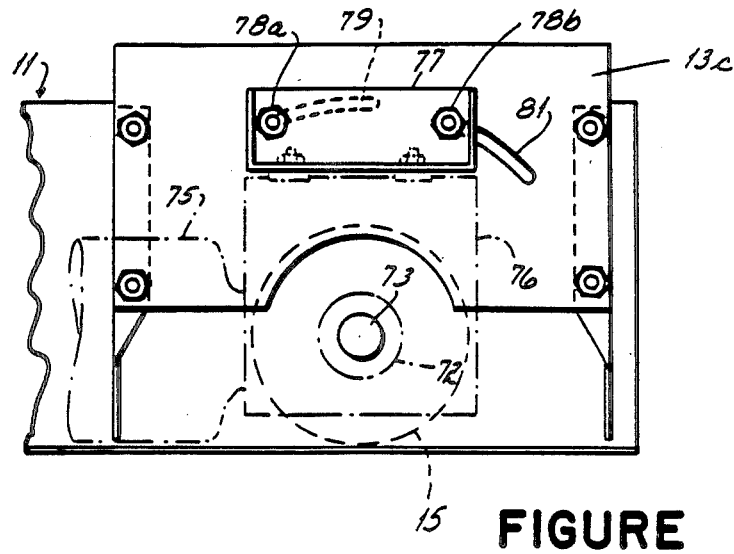
FIG. 3 is a cross-sectional view taken at lines 3—3 of FIG. 1.
Figure 4:
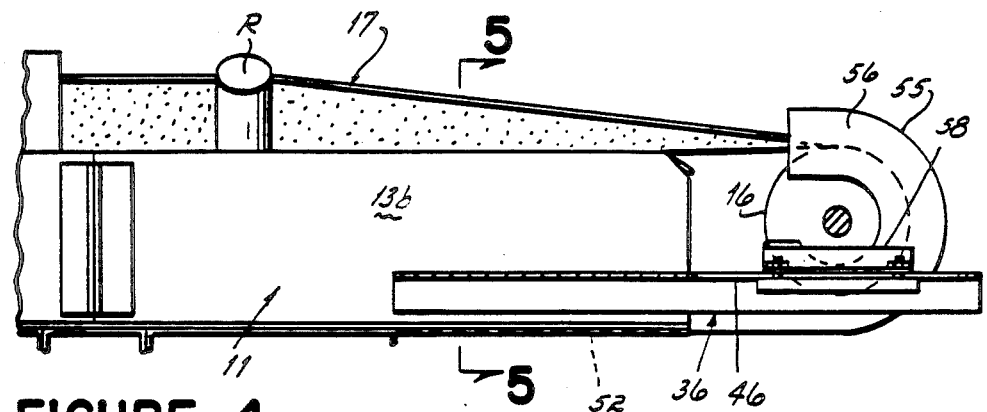
FIG. 4 is a cross-sectional view taken on line 4—4 of FIG. 2.

The motor and gear box are mounted to the side of the conveyor frame by a support bracket 77, as shown in FIGS. 1 and 3. Many different drive means or gear boxes and motors can be so mounted and a variety of different size brackets used to so mount them such that the output shaft of the drive is coaxial with the drive shaft of the drive pulley.

The mounting bracket 77 is connected to the conveyor frame 11 by means of a universal mounting plate 13c. This plate is preferably provided with arcuate slots 79 and 81 in the shape of an arc of a circle having a focus or center at the drive shaft axis. Fasteners 78a and 78b extend through the bracket 77 and slots 78a and 78b to provide for adjustable, rotational motion of bracket 77 about the drive shaft axis.

Since both slots are equidistant from the axle of the drive pulley, rotation of the support bracket and accordingly the gear box and motor along the arcuate slots 79 and 81 will maintain the output shaft axis directly in line with the drive shaft axis of the drive pulley. In use, the bracket 77 is loosened and is rotated until the motor and gear box are level, independently of the inclination of the conveyor. Bolts 78a and 78b are then tightened to secure the motor and gear box in a level position.

Moreover, it will be appreciated from the drawings the conveyor has a thickness or a height extending generally from the lower portion of the side frames to the upper portion thereof. Preferably, the drive means such as the motor and gear reducer have the same approximate overall height. By virtue of the drive mount described above, the drive is thus disposed substantially within the vertical confines of the conveyor and does not extend significantly above or below it, particularly when the conveyor is horizontal. This provides an advantageous configuration close to a floor or a ceiling, for example.

Also, it will be appreciated that other mounting configurations could be provided to meet the same ends. For example, the slots could be located in a suitable conveyor frame itself, instead of a separate universal mounting plate. Alternately, the slots could be provided in the support bracket as opposed to the conveyor or mounting plate.

Accordingly, the channel belt conveyor of the present invention provides a unique method of keeping the bottom pan of the conveyor belt clear of particulate material. Particularly, the three piece drag cleats permit the use of a drag cleat with a channel belt conveyor and acts to center the load along the center of the belt.

The improved hoods of the present invention provide a surface along which this particulate material can be pushed up on the belt, for each direction of conveyor movement. The fixed hood take-up roller structure as described provides the unique feature of accommodating the take-up adjustment of the belt, while maintaining the distance between the belt and the hood at a constant to maintain the drag pan cleaning feature. In a preferred embodiment, the conveyor includes a means to automatically remove the hood from the end of the conveyor when the direction of the belt is reversed. This permits the discharge of material from the normally otherwise hooded end of the belt.

Finally, the present invention also contemplates providing a variable slope conveyor with universal means to maintain the drive means at a level position independently of conveyor inclination.

Modifications of the present invention will become readily apparent to those of ordinary skill in the art from the above description, and may be made without departing from the scope of the present invention. Accordingly, applicant intends to be bound only by the following claims.

I claim:

1. An elongated belt conveyor of the type having side frames a belt drive pulley mounted on a pulley drive shaft having an axis between the side frames at a drive end of said conveyor, a belt idler pulley mounted on the frames at another end of said conveyor, an endless belt mounted around said pulleys, and drive means, including a motor, having an output shaft for rotating said pulley drive shaft and drive pulley, said conveyor further including means for supporting said drive means in a horizontal position independently of any longitudinal inclination of said conveyor and side frames and comprising:

a mounting plate separate from but secured to and supported by one of said frames at the drive end of said conveyor;

a drive means support bracket adjustably secured to said mounting plate for selective disposition with respect thereto;

said mounting plate being disposed in a plane between said one side frame and said support bracket;

said drive means mounted on and supported on said conveyor by said support bracket;

at least one arcuate slot in one of said mounting plate and said support bracket, said slot being in the shape of an arc of a circle having a focus on the drive shaft axis of the drive pulley; and fastener apparatus interconnecting said support bracket to said mounting plate for selective adjustment of said bracket with respect to said plate and to said conveyor, and about said axis;

said output shaft of said drive means disposed parallel to and connected coaxially with said pulley drive shaft such that said drive means is selectively maintained through said mounting means in a substantially horizontal position independently of any longitudinal inclination of said conveyor.

2. The conveyor as in claim 1, wherein said mounting plate is a universal plate having a bracket supporting surface comprising a flat metal plate.

3. The conveyor as in claim 2, further comprising a plurality of arcuate slots in said mounting plate such that any of a plurality of support brackets adapted to differing drives, can be adjustably attached to said plate.

4. The conveyor as in claim 2, wherein said side frames have a predetermined height between the top and bottom thereof and said mounting plate is disposed substantially within the same general upper and lower confines of said frames.

5. In an elongated belt conveyor of the type having side frames a belt drive pulley mounted on a pulley drive shaft having an axis between the side frames at a drive end of said conveyor, a belt idler pulley mounted on the frames at another end of said conveyor, an endless belt mounted around said pulleys, and drive means having an output shaft for driving said pulley drive shaft, the improvement comprising;

a drive means including a motor;
support means;
said drive means mounted on said support means;
a mounting plate secured to a side frame of said conveyor;
at least one arcuate slot formed in one of said support means and said mounting plate secured to a side frame of the conveyor, said slot being in the shape of an arc of a circle having a focus on the drive shaft axis of the drive pulley;
fastener means;

said support means being adjustably secured to said mounting plate by said fastener means with said mounting plate being disposed between said side frame of said conveyor and said support means;

said fastener means being movable along said slot for selectively adjusting the angular position of said support means and said drive means with respect to said side frame, to the conveyor, to the mounting plate, and about said focus;

said output shaft of said drive means being disposed in parallel disposition with respect to said pulley drive shaft axis;

coupling means for drivingly connecting the output shaft of the drive means to the parallel pulley drive shaft of the conveyor for rotating the pulley drive shaft and drive pulley, said coupling means rotating at least about said pulley drive shaft for all dispositions of said support means with respect to said mounting plate, such that said drive means is selectively maintained, in a substantially horizontal position independently of any inclination of said conveyor and said side frame; and wherein said side frames have a predetermined height between the top bottom thereof and said mounting plate is disposed substantially within the same top and bottom height confines of said frames.

6. The conveyor as in claim 1, wherein said support bracket is rotatable with respect to said mounting plate and said side frames and is movable independently thereof to maintain said drive means in a substantially horizontal position independently of any inclination of said conveyor.

7. The conveyor as in claim 5, wherein said support means is rotatable with respect to said mounting plate and said side frames and is movable independently thereof to maintain said drive means in a substantially horizontal position independently of any inclination of said conveyor.

* * * * *